(12) United States Patent
Brooks et al.

(10) Patent No.: US 9,181,454 B2
(45) Date of Patent: Nov. 10, 2015

(54) INTUMESCENT COMPOSITION

(75) Inventors: Rodney Brooks, Warwickshire (GB);
Simon Jones, Warwickshire (GB); Jason Sen, Warwickshire (GB); Claude Connor, Berkshire (GB); Mark Bramwell, Surrey (GB)

(73) Assignee: Tremco Illbruck Coatings Limited, Coventry (GB)

( * ) Notice: Subject to any disclaimer, the term of this patent is extended or adjusted under 35 U.S.C. 154(b) by 897 days.

(21) Appl. No.: 13/320,090

(22) PCT Filed: May 12, 2010

(86) PCT No.: PCT/GB2010/050774
§ 371 (c)(1),
(2), (4) Date: Jan. 6, 2012

(87) PCT Pub. No.: WO2010/131037
PCT Pub. Date: Nov. 18, 2010

(65) Prior Publication Data
US 2012/0174508 A1    Jul. 12, 2012

(30) Foreign Application Priority Data
May 12, 2009   (GB) .................................. 0908154.8

(51) Int. Cl.
| C09D 175/08 | (2006.01) |
| C08G 18/48 | (2006.01) |
| C08G 18/71 | (2006.01) |
| C08K 5/00 | (2006.01) |
| C08G 65/336 | (2006.01) |
| C08L 71/02 | (2006.01) |
| C09D 5/18 | (2006.01) |

(52) U.S. Cl.
CPC .............. *C09D 175/08* (2013.01); *C08G 18/48* (2013.01); *C08G 18/718* (2013.01); *C08G 65/336* (2013.01); *C08K 5/0016* (2013.01); *C08L 71/02* (2013.01); *C09D 5/185* (2013.01)

(58) Field of Classification Search
CPC .............................. C08G 18/48; C08G 18/718
See application file for complete search history.

(56) References Cited

U.S. PATENT DOCUMENTS

| 5,487,946 | A | * | 1/1996 | McGinniss et al. ............ 428/413 |
| 5,603,990 | A | * | 2/1997 | McGinniss et al. ......... 427/393.3 |
| 5,925,457 | A | * | 7/1999 | McGinniss et al. ............ 428/341 |
| 5,989,706 | A | * | 11/1999 | McGinniss et al. ............ 428/341 |
| 6,790,906 | B2 | | 9/2004 | Chaignon et al. | |
| 2007/0102686 | A1 | | 5/2007 | Aslin | |
| 2008/0224105 | A1 | | 9/2008 | Green et al. | |

FOREIGN PATENT DOCUMENTS

| CN | 101402845 | 4/2009 |
| EP | 1582541 | 10/2005 |
| WO | WO 2007/050000 | 5/2007 |
| WO | WO 2008/129242 | 10/2008 |
| WO | WO 2009/013532 | 1/2009 |
| WO | WO 2010/131037 | 11/2010 |

OTHER PUBLICATIONS

International Search Report and Written Opinion issued Aug. 30, 2010 in International Application No. PCT/GB2010/050774.
International Preliminary Report on Patentability issued Oct. 17, 2011 in International Application No. PCT/GB2010/050774.
Ahmad, et al., "To Study the Effect of Aluminium Trihydrate and Fumed Silica on intumescent Fire Retardant Costing," Journal of Applied Sciences, vol. 12, No. 24, pp. 2631-2635, (2012).

* cited by examiner

*Primary Examiner* — Joseph D Anthony
(74) *Attorney, Agent, or Firm* — Zhi-Xiang (Alex) Oh; Stoel Rives, LLP

(57) ABSTRACT

An intumescent composition which comprises a polymer selected from a silane-terminated polyurethane or a silane-terminated polyether, a plasticizer that is compatible with the polymer and an intumescent ingredient. Processes of forming a cured intumescent substance, and methods of fire protecting a building are also provided.

19 Claims, No Drawings

INTUMESCENT COMPOSITION

FIELD OF THE INVENTION

The present invention relates to an intumescent composition and its use in fire protection.

BACKGROUND OF THE INVENTION

Buildings having steel frameworks are particularly vulnerable to collapse in the event of a fire. Steel loses its strength as the temperature rises. By insulating the steel, the rate of heat transfer can be reduced, which can extend the time the building remains intact, giving more time for evacuation.

Passive fire protection is the term generally given to systems which rely on insulation to protect buildings from fire. Passive fire protection may be "reactive" or "non-reactive". Reactive systems are based on insulation which changes its physical and/or chemical nature in response to fire. Examples include intumescent, oblative and subliming systems. Non-reactive systems provide insulation without the need for any chemical or physical change. Examples include cementitious spray and vermiculite board.

Fire-protective coatings may be applied to steel framework for buildings either off-site (in the steel yard) or on-site (to the erected framework). Typical intumescent systems are based on a mixture of ammonium polyphosphate and melamine. These react to produce $N_2$ gas which results in a layer of foam several centimetres thick which insulates the framework.

Conventional one-component intumescent compositions are either solvent or water-based and form a dry film through evaporation of the solvent or water. This characteristic places practical limits on the maximum wet film thickness that can be applied in any one coat, as thick films tend to take a long time to dry.

Two-part epoxy resin based coatings have been used by Leigh's Paints to provide fire protective coatings on steel. Such coatings have excellent adhesion to steel, are hardwearing and rely on intumescence to provide fire protection.

Similarly, CharTek have developed a variety of products for use as fire protective coatings. CharTek 7, for instance, is a solvent-free, reinforced epoxy intumescent fire proofing coating, suitable to protect steelwork in a hydrocarbon fire.

Fire protective intumescent coatings are described extensively in the patent literature. US 2008/0224105 A1, for instance, describes a liquid intumescent coating composition comprising a resin system. The coating composition is curable to a solid state in a free radical polymerisation reaction. WO 2008/129242 describes an intumescent formulation comprising a source of carbon, a blowing agent, an acid source and clay such as an organoclay. The organoclay is thought to improve the thermal barrier properties of a foamed intumescent coating. WO2009/013532 describes a coating composition which comprises at least one intumescent ingredient incorporated into a resin binder which contains at least one covalently bonded phosphorous containing component.

However, these prior art compositions have limited intumescence-generating ability and as a result, thick layers of the compositions are required, which can be very expensive.

SUMMARY OF THE INVENTION

The present invention provides in a first embodiment an intumescent composition comprising a polymer selected from a silane-terminated polyurethane or a silane-terminated polyether, a plasticiser that is compatible with the polymer and an intumescent ingredient.

According to a second embodiment of the invention there is provided a process for forming a cured intumescent substance comprising applying a composition according to the first embodiment to a substrate and allowing the composition to cure.

According to a third embodiment of the present invention, there is provided a cured intumescent substance obtainable by the process as described in the second embodiment.

According to a fourth embodiment of the present invention, an intumescent composition according to the first embodiment is used in a fire-protective coating.

According to a fifth embodiment of the present invention, there is provided a building comprising a steel framework comprising the cured intumescent substance of the third embodiment.

By "intumescent composition" is meant a composition that is able to expand, or swell, when exposed to heat.

The intumescent compositions of the invention can be used to coat substrates such as steel intended to form building frameworks either off-site (during the steel preparation process) or on-site (after the steel framework has been laid in place at the site of the building). At high temperatures, the silane-terminated polyurethane or polyether breaks down. This is advantageous, since in the event of a fire, the polymer does not interfere with the intumescence generated by the intumescent ingredient.

The composition of this invention has high intumescence efficiency which means that relatively thin coatings can be applied to steel frameworks, which results in faster cure time and a more efficient and cheaper fire-protective process.

Ideally, each 1.5 mm of coating thickness will cure in one hour or less. This offers particular advantages over the prior art one-component systems which may require five or more coats to be applied, with up to two weeks for drying between coats.

The compositions of the invention have additionally been shown to have early weathering resistance compared to the prior art. The compositions are resistant to mechanical damage and are non-toxic and easy to repair when damaged, compared with epoxy or the one-component systems detailed above.

The prior art also discloses many compositions comprising fire retardant materials. Fire retardant materials suppress, reduce or delay the combustion of material. The present invention, on the other hand relates to intumescent compositions. These compositions provide fire protection via expanding, or swelling, when exposed to heat, thus increasing in volume.

DETAILED DESCRIPTION OF THE INVENTION

According to one aspect of the present invention, there is provided a two-part intumescent composition comprising a first part and a second part. The first part comprises a polymer selected from a silane terminated polyurethane or a silane terminated polyether, wherein this polymer is present in an amount of up to 100% by weight of the first part of the intumescent composition. The second part comprises a plasticiser that is compatible with the polymer and an intumescent ingredient typically present in an amount of 1-80% by weight of the second part of the composition. The amount of polymer present in the first part generally makes up 4-50% by weight of the first and second parts taken together. The first and second parts are separated from one another, for instance during storage, but in use, the first and second parts are mixed to achieve a cured substance which has the ability to intumesce on exposure to heat.

Preferably, in the two-part composition, there is a greater proportion by weight of the second part compared to the first part. In a particularly preferred embodiment of the invention, the ratio of first:second part is in the range 1:5 to 1:20 by weight.

In one-part compositions, all of the considerations mentioned below with regard to two-part compositions apply mutatis mutandis, save that the constituents are all mixed together and not separated into two parts, and that any 'wet' ingredients need to be dried prior to manufacture of the composition in order to prevent premature cure.

The silane terminated polyurethane or a silane terminated polyether is typically a liquid. The polymer gives rise to a cured composition having a 48-hour Shore A hardness of 65-85, preferably 70-80. The Shore A hardness is determined in accordance with the method described in the "Methods" section of this specification.

The polymer is present in an amount of up to 100% by weight of the first part of a two part composition, such that the amount of polymer present makes up 4-50% by weight, more preferably 5-20%, and most preferably 10% by weight of the first and second parts of the intumescent composition taken together. Preferably the first part of the two-part composition consists essentially of polymer, and more preferably consists solely of polymer. When the first part consists solely of or consists essentially of polymer, the first part is in the form supplied by the manufacturer, with no further processing or mixing required prior to delivery to the end user (compounding). This reduces the processing cost and speeds manufacture of the two-part composition. Further it avoids the need for the polymer to be extensively handled, and hence increases shelf life by reducing contamination or the inadvertent incorporation of atmospheric moisture.

In one-part compositions, the amount of polymer present typically makes up 4-50% by weight, more preferably 5-20%, and most preferably around 10% by weight of the intumescent composition.

Preferably the polymer is a telechelic polymer (ie. a polymer carrying at least one functionalised end group that has the capacity for selective reaction to form bonds with another molecule). More preferably the polymer is a telechelic polymer with difunctional or trifunctional end groups. Even more preferably both ends of the polymer have at least one functionalised end group, and most preferably both ends of the polymer have at least two functional end groups.

Preferably the polymer end groups result from the termination with an alpha or gamma silane. Most preferably, the end groups result from termination with an alpha-silane. Preferably the terminal functionalities are alkoxy groups, such that difunctional end groups give rise to two alkoxy groups pendant from the Si atom in a silane terminating group, and such that trifunctional end groups give rise to three alkoxy groups pendant from the Si atom in a silane terminating group. Preferably the polymer is of a low viscosity, for example 5,000-35,0000 mPas at 25° C. Typically the alkoxy group content of the polymer is 0.35-0.70 mmol/g, and preferably it is 0.35-0.70 mmol/g. More preferably the alkoxy group content is 0.40-0.50 mmol/g. Most preferably the alkoxy group content is a methoxy group content.

Examples of suitable polymers include Polymer ST61, Polymer ST75 and Polymer ST77 supplied by Hanse Chemie; Geniosil STP E10, Geniosil STP E15, Geniosil STP E30 and Geniosil STP E35 supplied by Wacker; Desmoseal SXP 2662, Desmoseal SXP 2458 and Desmoseal SXP 2636 supplied by Bayer; and Spur$^{+*}$1010LM, Spur$^{+*}$1050LM and Spur$^{+*}$1015LM supplied by Momentive. Preferred polymers are Geniosil STP E10 and STP E30 both supplied by Wacker. The most preferred polymer is Geniosil STP E10.

Preferably, at least one of the parts of a two-part composition, or the one-part composition comprises a cross-linker. A cross-linker accelerates the curing process. Preferably the cross-linker is a reactive silane crosslinker, more preferably an alkoxy silane which contains a reactive functional group, which is most preferably a primary amine. This cross-linker is preferably present at 0.05-1% by weight of the total composition.

Most preferably the cross-linker is in the first part of a two part composition.

The composition may also comprise a solvent to reduce viscosity and improve the sprayability of the composition. Typically the solvent is in the first part of a two-part composition. The solvent is chosen on the basis of compatibility with the polymer component. In the case of Geniosil STP E10, a suitable solvent is xylene.

The composition of this invention comprises a plasticiser and an intumescent ingredient. Typically these are in the second part of a two-part composition.

Looking first at the plasticiser, this must be compatible with the polymer and by this we mean that it will mix into the system without bleeding back out. The plasticiser has the function of softening and extending the final cured polymer network, and providing extra liquid components so that the mineral fillers are fully wetted-out. The plasticiser can be present in any amount sufficient to fulfil this purpose. Typical amounts of plasticiser are 5-20% of the second part, preferably 10-15% of the second part. Suitable plasticisers are derivatives of benzoic acid, phthalic acid (eg. phthalates, such as dibutyl-, dioctyl-, dicyclohexyl-, diisooctyl-, diisodecyl-, dibenzyl- or butylbenzyl phthalate), trimellitic acid, pyromellitic acid, adipic acid, sebacic acid, fumaric acid, maleic acid, itaconic acid and citric acid, alkyl phosphate esters and derivatives of polyester, polyether and epoxy and the like. Preferred plasticisers are alkyl esters for example phthalates, adipates, sebacates and benzoates, which may be blended together and blended with alkyl phosphate esters. An especially preferred example is a blend of Jayflex DNIP supplied by Exxon, with Plastomoll DOA, supplied by BASF, and Santicizer 148, supplied by Ferro. Castor Oil or similar natural products may also be used.

Typical amounts of plasticizer in a one-part composition are 10-40% by weight, preferably 15-30% by weight and most preferably around 20% by weight of the total composition.

The intumescent ingredient imparts on the resultant intumescent composition the ability to swell when exposed to heat. The ingredient is typically provided in the form of an intumescent filler composition which comprises two or more ingredients, which together result in intumescence.

The intumescent filler composition (which may alternatively be referred to as an "intumescent filler package") preferably comprises three components—an acid source, a carbon source and a spumific or gas source. Preferably an inorganic "nucleating agent" should be present and optionally additives, which may be solid or liquid by nature, may be added to aid char (foam) formation and strengthen the char.

The acid source may be selected from, for instance, ammonium polyphosphate, melamine phosphate, magnesium sulphate and boric acid. The preferred acid source is ammonium polyphosphate.

The use of coated ammonium polyphosphate is preferred, and ammonium polyphosphate coated with melamine formaldehyde is most preferred.

The acid source preferably constitutes from 35% to 65% by weight of the intumescent ingredient content of the intumescent composition.

Examples of suitable carbon sources include polyhydric alcohols such as pentaerythritol and dipentaerythritol. Starch and expandable graphite are other possible carbon sources. The preferred carbon sources are pentaerythritol and dipentaerythritol or a combination of the two.

The carbon source preferably constitutes from 5% to 40% by weight of the intumescent ingredient content of the intumescent composition.

Suitable gas sources include melamine, melamine phosphate, melamine borate, melamine formaldehyde, melamine cyanurate, tris-(hydroxyethyl) isocyanurate (THEIC), ammonium polyphosphate and chlorinated paraffin. The preferred gas source is melamine.

The gas source preferably constitutes from 5% to 40% by weight of intumescent ingredient content of the intumescent composition.

Although not an essential ingredient in intumescent reactions, inorganic "nucleating" agents are a preferred ingredient since they promote sites for the intumescent char to form, improve the thermal resistance properties and stability of the intumescent char during a fire. The intumescent coating compositions of the present invention ideally contain at least one nucleating agent, examples of which include titanium dioxide, zinc oxide, aluminium oxide, silica, silicates, heavy metal oxides such as cerium oxide, lanthanum oxide and zirconium oxide, mica and bentonite clay. A preferred nucleating agent is titanium dioxide which also provides opacity to the coating.

The nucleating agent preferably constitutes from 1% to 25% by weight of the intumescent ingredient content of the intumescent composition.

Further optional additives may be included as part of the intumescent ingredients to aid char formation and to strengthen the char and prevent char degradation. Such additives include solids such as zinc borate, zinc stannate, zinc hydroxystannate, glass flake, glass spheres, polymeric spheres, fibres (ceramic, mineral, glass/silica based), aluminium hydroxide oxide, boron phosphate, fumed silica.

In a preferred aspect of the invention, the intumescent ingredient is present in amount such that the composition is capable of swelling to at least three times, preferably at least ten times, most preferably at least 50 times its original volume when exposed to temperatures found in a typical fire situation. The temperature in a fire can be anywhere in the range 150-1000° C. and it is preferred that the composition starts to intumesce at a temperature in the lower part of this range. The reference temperature for measurement of swelling can be taken to be 500° C.

By expansion ratio is meant the number of times the composition swells compared to its original volume.

Typically, the intumescent composition of the invention swells to more than 300%, preferably more than 1000%, more preferably more than 5000% of its original thickness when in the form of a coating and exposed to heat at a temperature of 500° C. For instance, the composition may be applied to a substrate to form a layer approximately 1 mm thick after curing. Upon exposure to heat at a temperature of 500° C. this may swell to a thickness in the range 5-10 mm.

A typical intumescent filler package includes titanium dioxide, pentaerythritol, dipentaerythritol, ammonium polyphosphate, melamine and melamine containing compounds such as melamine phosphate and melamine cyanurate. Preferably, the fillers are as shown below and are present in the following amounts:

Titanium dioxide (5-15% by weight of total composition)
Pentaerythritol (5-15% by weight of total composition)
Amonium polyphosphate (20-40% by weight of total composition)
Melamine (5-15% by weight of total composition)

The total amount of intumescent ingredient, for instance, the intumescent filler composition, is typically in the range 40-80%, preferably 50-75% and most preferably 55-75% by weight of the total composition. Compositions comprising less intumescent ingredient than this are not so effective at producing intumescence.

The filler may also comprise intrinsically intumescent polymers or salts of such polymers. These proprietary materials have been developed by Prometheus Developments Limited, and are described in US Patent Application No. US2007/0102686A1.

The composition (in the case of a two-part composition, typically the second part) can also contain UV absorbers/stabilisers (for example Uvasorb HA supplied by 3V International SA or Tinuvin 765 supplied by Ciba); antioxidants (for example Irganox 245 or 1135 both supplied by Ciba); colour pigments or dyes (for example a carbon black, one example of which is Printex V supplied by Grohlman; or a titanium dioxide, one example of which is Kronos 2300 supplied by Kronos Ltd); rheology modifiers, such as clays (for example the Polywhite E from Imerys or Garamite from South Clay Products); or reaction catalysts (for example a tin catalyst, one example of which is Tinstab BL277 supplied by Polyone Co. Ltd), or wetting agents (such as fatty acid derivatives, one example of which is Dispers 652 from Tego Chemie); or structuring fibres such as rockwool.

The composition of the invention is typically a coating composition and forms a film on surfaces to which it is applied.

According to a second embodiment of the present invention, there is provided a process for achieving a cured intumescent substance. In the case of a two-part composition this process comprises the steps of (a) applying a first part of a two-part intumescent composition and a second part of a two-part intumescent composition to a substrate, and (b) allowing the first part of the two-part intumescent composition and the second part of the two-part intumescent composition to cure by allowing a reaction between the first part and the second part to proceed. Typically, the first part and the second part of the two-part composition are mixed together prior to application to the substrate. Preferably this pre-mixing occurs very shortly before application to the substrate, for example a few seconds before application in an on-line mixer incorporated into an airless spraying apparatus, or by means of any other spraying apparatus conventionally used to mix and apply two component coatings to substrates.

A one part composition may be applied using a similar spraying apparatus.

The composition used in this process has all of the same features as outlined above for the first embodiment of this invention.

As mentioned above, the two-part composition of the invention is cured by bringing the first part and the second part of the composition together, and allowing atmospheric moisture to initiate crosslinking of the polymer in the first part. This crosslinking can be further encouraged by addition of an adhesion promoter or cross-linker (such as Silane A1110 and Silane A171 both supplied by Momentive Performance Materials) into the second part of the composition.

The ratio of the first to second parts is generally recommended by the particular manufacturers and depends on the particular formulation of the parts.

A one-part composition cures by exposure to atmospheric moisture in the same manner.

The composition of the invention preferably provides a steel body with from 30 minutes to 4 hours of fire resistance, depending on the application, nature and geometry of the substrate and the coating thickness. Fire resistance is determined in accordance with BS476 Part 20. Preferably the steel body takes from 30 minutes to 4 hours, and most preferably at least one hour, to reach a critical failure temperature of 550° C.

Once the composition of the invention has fully cured, the 48 hour Shore A hardness is typically in the range of 65-85, preferably 70-80. The methods used to establish these values are set out below in accordance with the method described in the "Methods" section of this specification.

The intumescent compositions of the present invention are used to fire-proof buildings. The composition may be applied to the framework of the building, typically made of steel, either in the metal-forming plant ("off-site") or on-site after the framework has been erected. This may require the surface of the metal to be cleaned in a pre-treatment step. The surface may then need to be covered with a primer layer.

Steel sections requiring fire protection are normally blast cleaned prior to the application of an intumescent coating to remove millscale and other deposits that may lead to premature failure of the intumescent coating, either on prolonged atmospheric exposure or during a fire situation. In order to prevent deterioration of the blast cleaned surface, particularly where there is a delay in applying the intumescent coating, it is normal practice to apply a primer coating. This is often the case when the intumescent coating is applied on site.

Examples of suitable primers are coatings based on epoxy, modified epoxy (such as modified with polyvinyl butyral), polyurethane, acrylic, vinyl and chlorinated rubber. Primers based on epoxy are preferred.

The thickness of the primer is ideally in the range from 15 microns to 250 microns. Preferably the thickness should be in the range from 25 microns to 100 microns.

Thereafter, the composition of the invention may be applied. The two-parts of a two-part composition are typically mixed very shortly before application to the metal. The composition is generally sprayed onto the metal, although it may alternatively be applied manually, for instance using an implement such as a trowel. The composition is normally applied in separate layers, the thickness of each layer and the number of layers being determined by the desired speed of application and time of fire protection. Applying a single, relatively thick layer gives a fast rate of application (but may take longer to cure). Applying multiple, relatively thin layers gives a smoother and more visually appealing decorative finish. The dry thickness of intumescent coating applied typically varies from 250 μm to 5 mm depending on the level of fire protection required, the cross-sectional area of the steel and the perimeter of the steel when viewed in cross-section.

A decorative topcoat may be applied to the cured intumescent coatings of the present invention, particularly to provide colour to exposed steelwork. A topcoat if correctly formulated will also enhance the durability of the intumescent coating compositions. A clear sealer may also be suitable.

Examples of suitable decorative topcoats are coatings based on epoxy, polyurethane, alkyd, acrylic, vinyl and chlorinated rubber. Decorative topcoats based on urethane or epoxy are preferred.

The thickness of the decorative topcoat can vary from 15 microns to 250 microns. Preferably the thickness should be in the range from 25 microns to 75 microns, as too high a thickness of topcoat may inhibit the intumescent reactions.

Compositions of the invention may also be useful in protecting other structural materials such as concrete and timber.

Methods

Brookfield Viscosity:

This test is a simple method for the determination of the viscosity of very viscous materials. It uses a Brookfield RVT Viscometer and a T-bar spindle.

The spindle is attached to the viscometer which rotates the bar at a known speed (which may be varied from 0.5-100 rpm). The viscometer measures the resistance to rotation and this is translated to a measuring scale. The measurement is taken when the reading on the scale stabilises and a conversion calculation (according to the Brookfield manual) is carried out to yield a value of viscosity.

The mixed viscosity is normally measured for this material as this gives a good indication of whether the material is sprayable or not.

Due to the short pot life of the mixed material, a "dummy" part B is used, with the reactive silane replaced with an inert liquid (such as Sovermol 1058, a non-reactive diluent available from Cognis GmbH) of similar viscosity.

Firstly the material is conditioned to a temperature of 20±1° C.

Spindle 7 is normally used, although other spindles may be substituted to deal with higher or lower viscosity materials, and measurements are made at 1, 2.5, 5, 10, 20, 50 and 100 rpm. In each case, viscosity is recorded after 60 seconds has elapsed at that speed.

Shore Hardness:

The hardness of plastics is most commonly measured by the Shore test. This method measures the resistance of plastics toward indentation and provides an empirical hardness value that does not necessarily correlate well to other properties or fundamental characteristics. The Shore A scale is used for "softer" plastics and rubbers while the Shore D is used for "harder" ones.

The Shore hardness is measured with an apparatus known as a Durometer and consequently is also known as "Durometer hardness". The hardness value is determined by the penetration of the Durometer indenter foot into the sample. Because of the resilience of rubbers and plastics, the indentation reading may change over time—so the indentation time is sometimes reported along with the hardness number.

In our case, we use a standard Shore A durometer which applies a force of 822 grammes to a hardened steel foot in the shape of a truncated 35° cone, 0.79 mm in diameter. The force is applied for one second and the hardness is read off the dial.

4-hour, 24-hour and 48-hour versions of the test refer to the curing time that the material is allowed before the hardness is measured.

A 4 mm thick wet film is spread onto a flat steel panel using a film spreader. The film is then left in ambient conditions and the tack free time is recorded. The Shore A hardness is measured at intervals.

Tack-free Time:

This is the time needed for the material to cure to the extent that touching the surface of the material no longer leads to uncured sealant being transferred to the fingers. In practice, it is the time at which the material can be handled. As such, the Tack-free Time is measured by touching a sample with a gloved finger at intervals, until no transfer to the glove is detectable to the person touching the sample.

Fire Testing

Fire testing of intumescent compositions for structural steel is normally carried out using a furnace to simulate the effect of a fully developed fire in a room or building compartment. These furnaces are normally either natural gas, liquid petroleum gas or diesel fuelled and consist of a number of burners mounted in the walls of a refractory enclosure. Modern equipment is computer controlled to follow predetermined heating curves, normally to ISO834, and maintain a set pressure, normally around 20 Pa. The furnaces vary in size from a fraction of a cubic meter to the typical "floor furnace" used to test intumescent compositions at independent test houses which are normally about 4 m long by 3 m wide by 2.5 m high.

There are many fire test standards applicable to intumescent compositions for structural steel across the world, these include BS476 part 20, EN13381 part 8 (published in draft), ISO834 part 11 (in development) and UL263. These all involve the preparation of a number of specimens of structural steel of different sizes, geometries and weights coated with different thicknesses of intumescent which are exposed to the heat of the furnace for periods between 30 minutes and four hours. The temperature rise of each sample is measured using thermocouples and recorded. This data is then used to create a comprehensive set of tables, using interpolation or mathematical modelling, that defines the thickness of intumescent required to limit the temperature rise of a particular steel section to a particular limiting temperature for the fire protection period required.

The critical temperatures recorded in the Examples below record the failure temperature of the steel. Different structural elements generally fail at different temperatures. For instance, columns (vertical members) typically fail at 550° C., whereas beams (horizontal members) typically fail at 620° C. Flat plates used in laboratory testing fail at 500° C.

One-Part Composition

For the one-part composition, a 0.6 mm nominal thickness coating was applied to a 5 mm thick steel panel of dimensions 300×200 mm. The panel was primed with Nullifire S620 primer, a 1 pack alkyd primer. This panel was left to cure for 1 week before being fire tested in the Nullifire Mini Furnace to the BS 476 pt20 heating regime. The Nullifire mini furnace has dimensions 0.5×0.5×0.5 m and is gas-fired to a temperature>1000° C. The time taken for the steel panel to reach a particular critical temperature is recorded.

Two-Part Composition

The fire testing for the 2 part composition was carried out with brush applied specimens and according to BS 476 pt 20 on the Nullifire 1.5 m³ furnace, which has dimensions 1.5× 1.5×1.5 m. The dimensions of the steel sample under test and the dry film thickness (DFT) of the coating are outlined further below.

The rate of heating of steel is dependent on the $H_p/A$ value of the section, where the $H_p$ is the perimeter of the steel when viewed in cross-section, and A is the cross-sectional area.

The invention will now be illustrated by way of the following examples:

CONTROL EXAMPLE

The temperature rise of an unprotected piece of structural steel in furnace conditions according to ISO834 has been measured experimentally on many occasions, for example by British Steel, and is well known and is documented in publications such as BS5950 part 8. The equation time, t=0.54× (limit temp−50)×(Hp/A)−0.6 is given in BS5950 part 8 and predicts a time to 620° C. of only around 14 minutes for unprotected steel for a 406 mm×178 mm×60 kg universal beam coated with 4 mm of intumescent coating, mounted in the roof of a 1.5 m×1.5 m a 1.5 m gas fired furnace.

Example 1

One Part Composition

| Component | Function | % wt | Trade name | Supplier |
|---|---|---|---|---|
| STP Polymer | Polymer | 9.98 | Geniosil STP-E10 | Wacker |
| DOA | Plasticizer | 19.91 | Plastomoll DOA | BASF |
| Rutile Titanium Dioxide | Intumescent Filler | 13.00 | Kronos 2300 | Kronos |
| Pentaerthyritol | Intumescent Filler | 11.34 | Charmor PM40 | Perstorp |
| Melamine | Intumescent Filler | 9.68 | Melamine | BASF |
| Zinc Borate | Intumescent Filer | 1.27 | Firebrake ZB | 20 Mule Team |
| Ammonium Polyphosphate | Intumescent Filler | 33.74 | Exolit Ap422 | Clariant |
| Gamma-aminopropyl trimethoxy silane | Cross-linker | 1.11 | Silane A1110 | Momentive |

Properties:
Viscosity: (Brookfield, spindle 6, 20 rpm, 20° C.)=270-330 Poise
Hardness Development:
(4 hrs tack free time)
8 hrs: 30-35 Shore A
16 hrs: 55-60 Shore A
Fire Test:
Nullifire Mini Furnace (DFT=0.65 mm) time to 500° C.=35 minutes Example 2

Two-Part Composition (Sprayable)

| | Function | % wt | Trade Name | Supplier |
|---|---|---|---|---|
| 1st Part Component | | | | |
| STP Polymer | Polymer | 80 | Geniosil STP-E10 | Wacker |
| Gamma-aminopropyl trimethoxy silane | Cross-linker | 8.9 | Silane A1110 | Momentive |
| Xylene | Solvent | 11.1 | | |
| 2nd Part Component | | | | |
| Dioctyl adipate | Plasticizer | 4.59 | Plastomoll DOA | BASF |
| Diisononyl pthalate | Plasticizer | 4.59 | Plastomoll DINP | BASF |
| Isodecyl diphenylphosphate | Plasticizer | 4.59 | Santicizer 148 | Ferro |
| Xylene | Solvent | 9.68 | | |
| Rutile Titanium Dioxide | Intumescent Filler | 12.74 | Kronos 2300 | Kronos |
| Pentaerythritol | Intumescent Filler | 11.21 | Charmor PM40 | Perstorp |
| Melamine | Intumescent Filler | 11.21 | Melamine | BASF |
| Ammonium | Intumescent | 34.15 | Exolit AP422 | Clariant |

-continued

| | Function | % wt | Trade Name | Supplier |
|---|---|---|---|---|
| polyphosphate | Filler | | | |
| Fatty Acid derivative | Dispersing additive | 0.76 | Disperse 652, | Tego Evonik |
| Alkyl Quaternary Ammonium clay | Thixotropic agent | 2.04 | Garamite 1958 | Rockwood Additives Ltd |
| China Clay | Thickening Agent | 2.55 | Polywhite E | Imerys Minerals Ltd |
| Benzenepropanoic acid, 3,5-bis (1,1-dimethyl-ethyl)-4-hydroxy-, C7-C9 branched alkyl esters | Anti-oxidant | 0.76 | Irganox 1135 | Ciba |
| Man-made Silicate fibres | Char reinforcement | 1.12 | lapinus Roxul 1000 | Lapinus Fibres BV |

Mixing ratio 1$^{st}$ part to 2$^{nd}$ part=11.5:100
Properties:
Viscosity: mixed, spindle 7, 50 rpm, 20° C. 300-340 Poise
Hardness development: Tack free time: 45-60 minutes
   2 hrs 40-45 Shore A
   3 hrs 50-55 Shore A
   6 hrs 60-65 Shore A
   24 hrs 75-80 Shore A
Fire Testing:
Universal Column, 203×203×52, Hp/A 180 m$^{-1}$, DFT 3.8 mm. Nullifire 1.5 m$^3$ Furnace, to BS 476 pt20
Time to Critical Temperature (550° C.)=93 minutes
Expansion ratio measured on a steel panel in a 600° furnace=23. Onset of intumescence was at 315° C.

Example 2 was repeated using the same 1$^{st}$ part and 2$^{nd}$ part components. However, the first and second parts were mixed in the ratio 1$^{st}$ part to 2$^{nd}$ part of 25:10. Very little intumescence was detectable.

Example 3

Two Part Composition

Trowelable (no solvent)

| | Function | % wt | Trade Name | Supplier |
|---|---|---|---|---|
| 1$^{st}$ Part Component | | | | |
| STP Polymer | Polymer | 90 | Geniosil STP-E10 | Wacker |
| Gamma-aminopropyl trimethoxy silane | Cross-linker | 10 | Silane A1110 | Momentive |
| 2$^{nd}$ Part Component | | | | |
| Dioctyl adipate | Plasticizer | 4.87 | Plastomoll DOA | BASF |
| Diisononyl pthalate | Plasticizer | 4.87 | Plastomoll DINP | BASF |
| Isodecyl diphenylphosphate | Plasticizer | 4.87 | Santicizer 148 | Ferro |
| Rutile Titanium Dioxide | Intumescent Filler | 14.62 | Kronos 2300 | Kronos |
| Pentaerythritol | Intumescent Filler | 13.00 | Charmor PM40 | Perstorp |
| Melamine | Intumescent Filler | 13.00 | Melamine | BASF |
| Ammonium polyphosphate | Intumescent Filler | 39.53 | Exolit AP422 | Clariant |
| Fatty Acid | Dispersing | 0.73 | Disperse 652, | Tego |

-continued

| | Function | % wt | Trade Name | Supplier |
|---|---|---|---|---|
| derivative | additive | | | Evonik |
| Alkyl Quaternary Ammonium clay | Thixotropic agent | 1.62 | Garamite 1958 | Rockwood Additives Ltd |
| China Clay | Thickening Agent | 2.06 | Polywhite E | Imerys Minerals Ltd |
| Benzenepropanoic acid, 3,5-bis (1,1-dimethyl-ethyl)-4-hydroxy-, C7-C9 branched alkyl esters | Anti-oxidant | 0.81 | Irganox 1135 | Ciba |

Mixing ratio 1$^{st}$ part:2$^{nd}$ part by weight=10.8:100
Properties:
Hardness development Tack free time: 45-60 minutes
   2 hrs 45-50 Shore A
   3 hrs 60-65 Shore A
   6 hrs 70-75 Shore A
   24 hrs 75-80 Shore A
Fire Testing:
Universal Column, 203×203×52, Hp/A 188 m$^{-1}$, DFT 3.95 mm. Nullifire 1.5 m$^3$ Furnace, to BS476 pt20
Time to Critical Temperature (550° C.)=91 minutes

The invention claimed is:

1. A two part intumescent composition comprising;
   a first part comprising a polymer selected from a silane-terminated polyurethane or a silane-terminated polyether, wherein this polymer is present in an amount of up to 100% by weight of the first part of the intumescent composition; and
   a second part comprising an intumescent ingredient and a plasticizer that is compatible with the polymer;
   wherein the first and second parts are separated from one another; and
   wherein in use, the first and second parts are mixed to achieve a cured intumescent substance.

2. A process for forming a cured intumescent substance comprising applying a composition according to claim 1 to a substrate and allowing the composition to cure.

3. The process according to claim 2 for forming a cured intumescent substance comprising the steps of:
   (a) applying the first part of the two-part intumescent composition and the second part of the two-part intumescent composition to a substrate, and
   (b) allowing the first part and the second part to cure by allowing a reaction between the first part and the second part to proceed, and form the cured intumescent substance.

4. A cured intumescent substance obtainable by the process of claim 2.

5. A method of using a composition according to claim 1 to fire protect a building framework, preferably a steel framework by applying said composition to the building framework.

6. A building comprising a steel framework and coated thereon, a cured intumescent substance according to claim 4.

7. A method of fire protecting a building comprising applying a composition according to claim 1 to the framework of the building and curing the composition.

8. The composition according to claim 1, wherein the polymer is a telechelic polymer with di- or tri-functional end-groups.

9. The composition according to claim 1, wherein the polymer has an alkoxy group content of 0.35-0.70 mmol/g.

10. The composition according to claim 9, wherein the polymer has a methoxy group content of 0.35-0.70 mmol/g.

11. The composition according to claim 1, wherein the plasticizer comprises one or more of a phthalate, an adipate, and a sebacate.

12. The composition according to claim 1, wherein the intumescent ingredient comprises an intumescent filler composition comprising an acid source, a carbon source, and a gas source.

13. The composition according to claim 12, wherein the intumescent filler composition comprises titanium dioxide, pentaerythritol, ammonium polyphosphate, and melamine.

14. The composition according to claim 1, further comprising a cross-linker.

15. The composition according to claim 1, wherein the composition is capable of swelling to at least three times its original volume when heated to 500° C.

16. The composition according to claim 15, wherein the composition is capable of swelling to at least ten times its original volume when heated to 500° C.

17. The composition according to claim 16, wherein the composition is capable of swelling to at least 50 times its original volume when heated to 500° C.

18. The composition according to claim 1, wherein the amount of intumescent ingredient present is selected from 40-80%, 50-75%, and 55-75% by weight of the total composition.

19. The composition according to claim 1, wherein the intumescent ingredient is present in an amount of 1-80% by weight of the second part of the composition.

* * * * *